March 12, 1940. A. WINTHER ET AL 2,193,214
ELECTROMAGNETIC CONTROL
Filed Jan. 7, 1938 7 Sheets-Sheet 1

FIG.1.

Martin P. Winther,
Anthony Winther,
Inventors.
Delos G. Haynes,
Attorney.

FIG. 2.

March 12, 1940.  A. WINTHER ET AL  2,193,214
ELECTROMAGNETIC CONTROL
Filed Jan. 7, 1938    7 Sheets-Sheet 4

FIG. 4.

March 12, 1940.  A. WINTHER ET AL  2,193,214

ELECTROMAGNETIC CONTROL

Filed Jan. 7, 1938  7 Sheets-Sheet 5

Martin P. Winther,
Anthony Winther,
Inventors.
Delos G. Haynes,
Attorney.

March 12, 1940.   A. WINTHER ET AL   2,193,214
ELECTROMAGNETIC CONTROL
Filed Jan. 7, 1938   7 Sheets-Sheet 6

Martin P. Winther,
Anthony Winther,
Inventors,
Delos G. Haynes,
Attorney.

March 12, 1940.    A. WINTHER ET AL    2,193,214
ELECTROMAGNETIC CONTROL
Filed Jan. 7, 1938    7 Sheets-Sheet 7

Martin P. Winther,
Anthony Winther,
Inventors.
Delos G. Haynes,
Attorney.

Patented Mar. 12, 1940

2,193,214

UNITED STATES PATENT OFFICE

2,193,214

ELECTROMAGNETIC CONTROL

Anthony Winther, Kenosha, Wis., and Martin P. Winther, Waukegan, Ill.

Application January 7, 1938, Serial No. 183,806

13 Claims. (Cl. 172—284)

This invention relates to electromagnetic controls, and with regard to certain more specific features, to such controls for electromagnetic power transmissions.

The invention herein disclosed is an improvement upon the apparatus described in patents of Anthony Winther, Nos. 1,982,461, dated November 27, 1934, and 2,025,487, dated December 24, 1935.

Among the several objects of the invention may be noted the provision of an electromagnetic control for electromagnetic transmissions and the like wherein the driving slip may be controlled without the necessity of controlling the necessary electrical circuit for magnetic excitation; the provision of apparatus of the class described wherein a simple, constant, direct-current, exciting circuit is used for excitation; the provision of apparatus of the class described which eliminates all sliding connections and electrical control contacts (or at least the latter) in said exciting circuit; and the provision of apparatus of the class described in which maintenance and service costs are substantially reduced. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention.

Similar reference characters indicate corresponding parts throughout the several views of the drawings.

In Patents 1,982,461 and 2,025,487, referred to above, there is employed an inductive driver which cooperates magnetically with a driven field member. The magnetic field which effects the electromagnetic coupling between the driving and driven members is generated by use of an electric circuit. This magnetic field allows of some mechanical slip between the driver and driven members and this slip is increased as the magnetic field is weakened, and vice versa. The magnetic field is weakened or strengthened by reducing or increasing the current in the circuit, and according to the method shown in said patents, shunt contacts in connection with shunt resistances are used in the circuit for that purpose. Furthermore, in both patents, slip rings are necessary in order to supply current to the moving field member. Even by using a stationary form of exciting coil, such as shown in Fig. 6 of the United States Patent No. 2,106,542 of Anthony Winther, for Electromagnetic apparatus, dated January 25, 1938, there has still been the necessity for a method of electric circuit control. By use of the present invention one may avoid all electrical circuit contacts.

Figure 1:
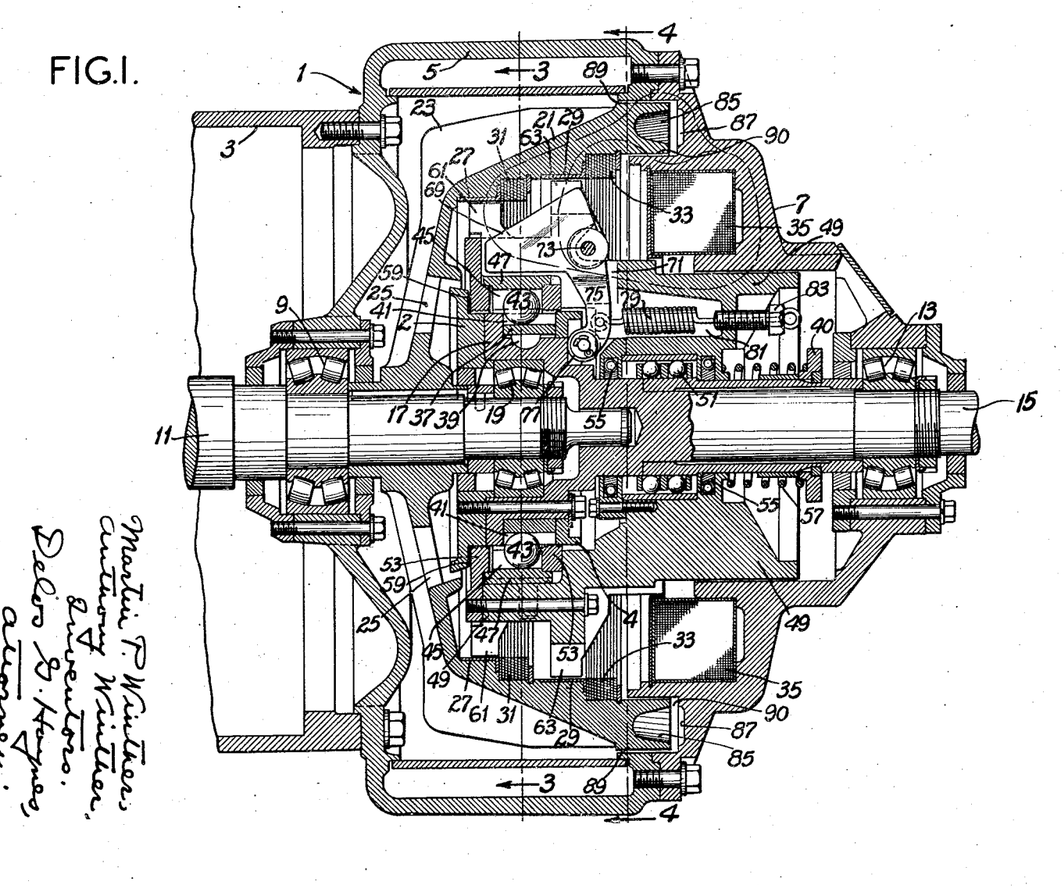
Fig. 1 is a longitudinal section taken on line 1—1 of Fig. 3 and shows a preferred form of the invention in starting condition.

Referring now more particularly to Fig. 1, there is shown at numeral 1 a stationary casing made up of component hollow members 3, 5, and 7. Within the casing 1 is a bearing 9 for supporting a drive shaft 11, and a bearing 13 for supporting a driven shaft 15. The drive shaft is piloted in a bearing 19 in a hub 17 of the driven shaft 15. Thus the drive shaft 11 and the driven shaft 15 may rotate or slip relatively.

Keyed to the drive shaft 11 is a cup-like inductor member 21 having suitable exterior cooling fins 23 and ventilating openings 25. The inductor 21 is composed of para-magnetic material.

On the inner surface of the inductor 21 are held two bands 27 and 29 of thin, conductive material such as copper. Adjacent to the bands 27 and 29 are rings 31 and 33, respectively. Each of said rings 31 and 33 is composed of magnetic material in which the ability to produce eddy-currents is reduced as much as possible. This is done by making up the rings 31 and 33 of peripheral laminations of thin sheet-iron, between which are poor conducting surfaces. The inductor 21, bands 27, 29 and rings 31, 33 rotate as a unit when driven by the driving shaft 11.

In the member 7 of the stationary casing 1 is supported a circular coil 35 which is energized from a suitable direct-current source. This source may be the direct-current batteries of a vehicle such as a railway car, the air-conditioning drive of which the present invention may control. No collector brushes, contacts nor other contacts are necessary in the exciting current for the winding 35 other than may be necessary for non-automatic control purposes such as a hand switch for connecting and disconnecting the battery.

Certain parts that rotate with the driven shaft 15 have endwise movement with respect thereto, and others have not. Those parts that have no endwise movement and which are important for descriptive purposes are the hub 17 (already mentioned), a ring 37 which is keyed to the hub as indicated at 39, and a reaction collar 40. Clamp rings 2 and 4 serve holding purposes.

Figure 3:
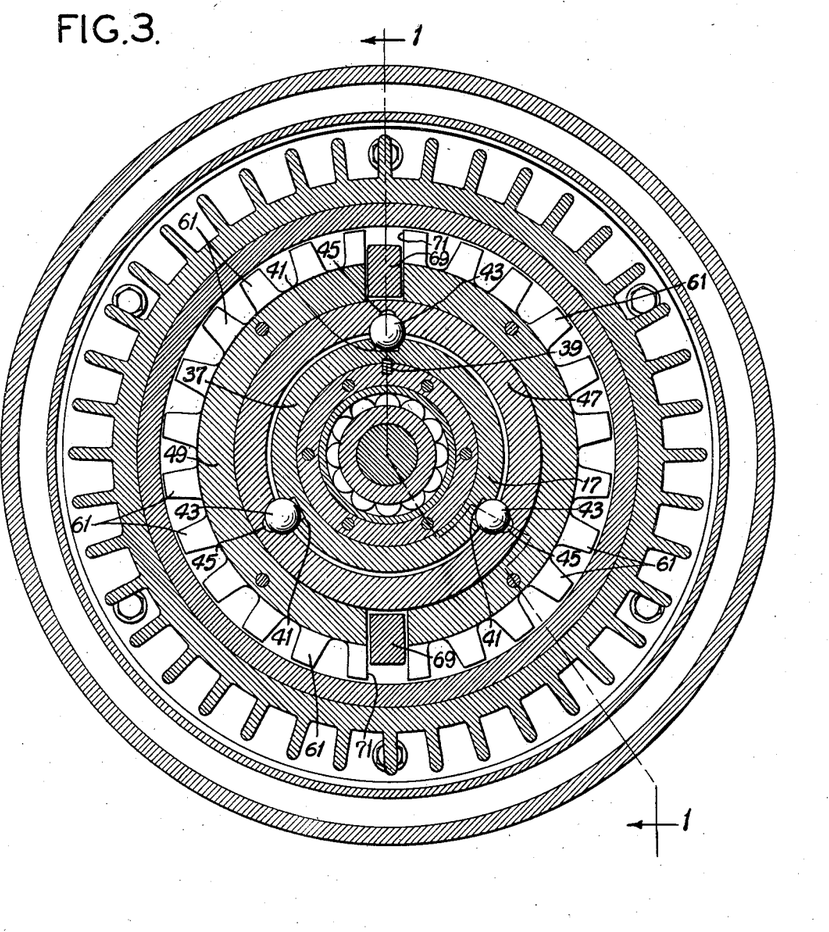
Fig. 3 is a vertical section taken on line 3—3 of Fig. 1.

Fig. 3 clarifies how the ring 37 is keyed to the hub 17. This ring 37 carries three grooves 41 parallel to its axis for the reception of ball bearings 43. The bearings 43 also ride in grooves 45 of a second, outer ring 47. Thus the rings 37 and 47 have the possibility of relative endwise movement without the possibility of relative rotary movement.

The outer ring 47 is keyed within the hollow end of a para-magnetic sleeve 49. Besides being supported upon said bearing 43, the sleeve 49 is supported upon a second set of axially movable bearings 51. The entire support of the sleeve 49 is upon the driven shaft 15 and upon parts directly associated therewith. Hence, the sleeve 49 may be moved axially with respect to the shaft 15 and its hub 17. Suitable pairs of oil seals are provided at 53 and 55.

A compression spring 57 reacting from the reaction collar 40 normally presses the sleeve 49 to the left (Fig. 1). The movement is limited by the contact at the surfaces indicated at numeral 59.

Figure 4:
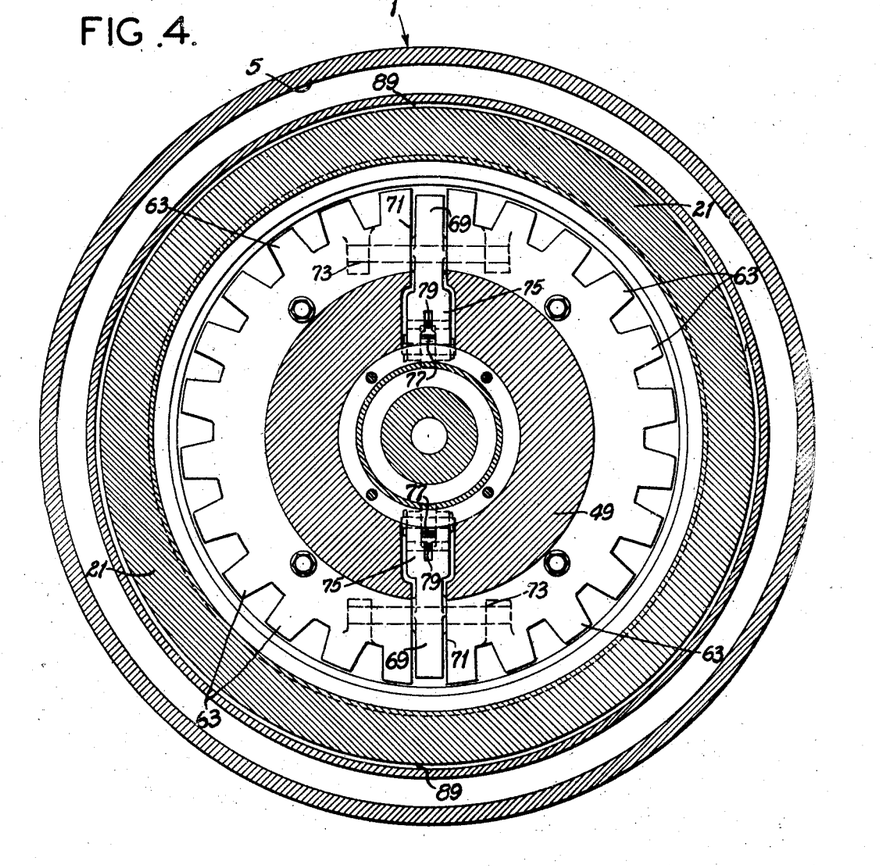
Fig. 4 is a vertical section taken on line 4—4 of Fig. 1.

The outer periphery of the left-hand end of the sleeve 49 is formed as two rows of radially extending teeth 61 and 63, respectively. In Fig. 3 the entire row of teeth 61 is shown and in Fig. 4 the entire row of teeth 63 is shown. These teeth, like the sleeve 49, are para-magnetic. They serve to concentrate flux that passes through the sleeve 49 and into said inductor 21. By this means, upon relative motion of the members 21 and 49, eddy-currents are set up in the inductor 21, and particularly in the conducting bands 27 and 29. The reaction between the magnetic fields of these eddy-currents and of that emanating from the teeth effects a magnetic drive between the members 21 and 49 which is in proportion to the strength of the field emanating from the teeth 61 and 63. The purpose of having two rows of teeth will appear.

Figure 2:
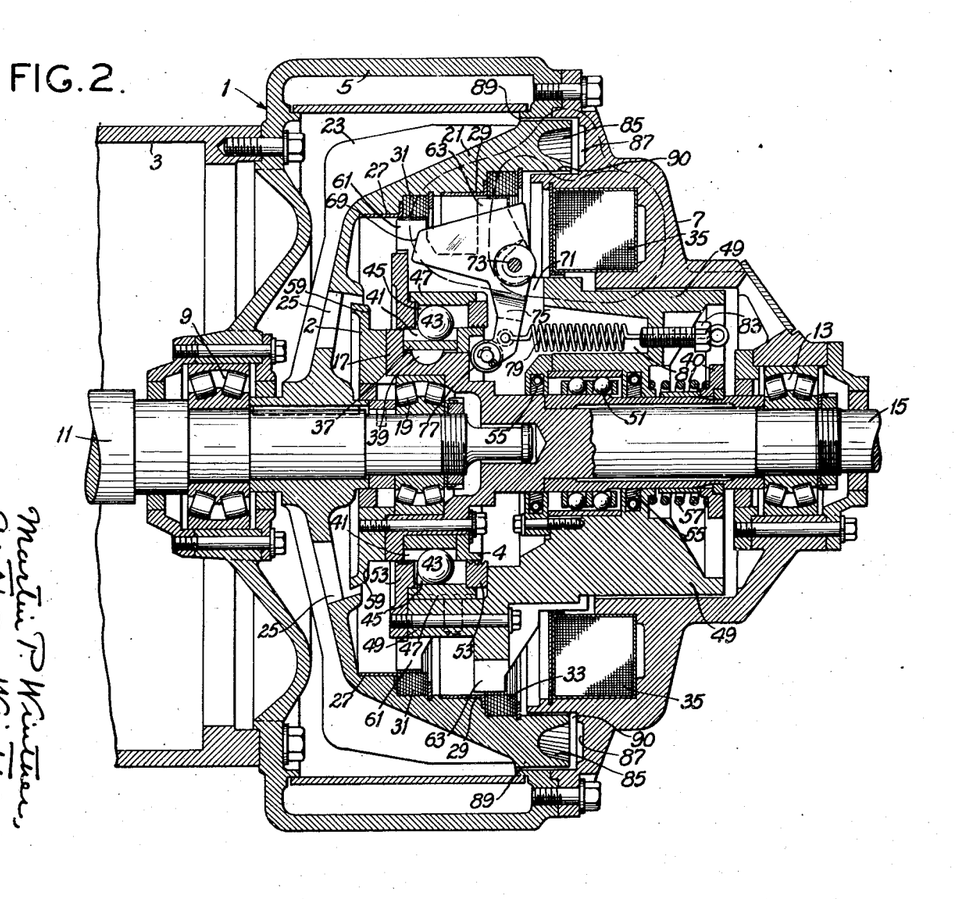
Fig. 2 is a view similar to Fig. 1 showing the apparatus in a running condition.

In Fig. 1 the rows of the teeth 61 and 63 respectively are shown as having axial positions which bring the teeth opposite the conducting bands 27 and 28 respectively. It will be seen that if the sleeve 49 be pushed back (to the right) against the expansive action of the spring 57, then the rows of teeth 61 and 63 will be brought into position opposite the laminated rings 31 and 33 respectively (Fig. 2). In such moved position, the flux from the teeth 61 and 63 is directed into the laminations of the rings 31 and 33, and since these, by reason of their laminated form resist the flow of eddy-currents, they also inhibit the formation of a reacting magnetic field. Hence the driving effect between the inductor 21 and the sleeve 49 is reduced in this position of the sleeve 49.

The driving effect can be adjusted from a maximum (when the sleeve is as far to the left as possible) to a minimum (when the sleeve 49 is in its extreme right-hand position). During normal operation the position of the sleeve 49 is somewhere beween its extreme endwise positions.

It is one of the purposes of the present control to obtain a substantially constant speed of the driven shaft under variable-speed conditions of the driving shaft 11. In order to accomplish this, the axial position of the sleeve 49 on the shaft 15 is determined by the centrifugal effect of a pair of weights 69 which are positioned within recesses 71 of the sleeve 49. Each weight 69 is on a rotary support in the sleeve 49 as indicated at 73. The center of gravity of each weight 69 lies ahead (to the left in Fig. 1) of its respective rotary support, so that under increased angular velocity of the driven shaft 15, the weights tend to swing clockwise. Each weight is provided with a bifurcated arm 75 which carries a roller 77, the latter being forced against a suitably machined surface on the hub 17. This is caused by the spring 57 pushing the sleeve 49 to the left. Tension springs 79 arranged in suitable sockets 81 within the sleeve 49 react from adjusting screws 83 and tend to hold the weights in, and the rollers 77 toward the right, thus permitting the spring 57 to force the sleeve 49 to the left.

When the driven member rotates, the centrifugal force of the weights 69, exerted at their centers of mass, effect a clockwise rotation of the weights which in turn forces the roller 77 against the stationary hub 17. Thus a reaction is engendered at the pivot pins 73 of the weights 69 which drives the sleeve 49 toward the right, against the reaction of spring 57. If the speed of the driven shaft 13 incipiently drops, then the spring 57 returns the sleeve 49 to the left, and the rollers 77 are maintained against the surface of the hub 17.

The dash lines in Figs. 1 and 2 outline the sectional shape of the toric magnetic circuit engendered by the coil 35. The members 7, 21, and 49, through which it passes are all para-magnetic. In Fig. 1 it is directed through the conducting bands 27 and 29; whereas in Fig. 2 it is directed in part through the low-eddy-current rings 31 and 33. In the former position the magnetic circuit induces a substantial reacting magnetic field; whereas in the latter position (in Fig. 2), the inductive function is inhibited because the laminations inhibit the necessary production of eddy-currents.

The edge of the cup-shaped inductor 21 is peripherally recessed as shown at numeral 85. The portion 7 of the stationary housing 1 is also recessed as shown at numeral 87. These recesses are opposite one another and serve to increase the endwise magnetic gap and to split the magnetic field so that it rather crosses the radial gaps 89 and 90. By this means end thrust due to magnetic attraction is avoided, and at the same time all radial attractive forces are substantially balanced. The latter feature avoids the possibility of magnetically accentuating any slight lack of dynamic balance in the inductor 21.

Operation of the apparatus is as follows:

Let it be assumed that the coil 35 has a substantially constant current flowing through it. This will produce a substantially constant flux field about the coil 35. This field passes out of sleeve 49 from the ends of the teeth 61 and 63, into the inductor 21 and through the member 7.

If the driving shaft 11 be rotated, the inductor 21 will also rotate. This causes a relative motion between the inductor and the plurality of flux concentrations which emanate from the teeth 61 and 63. This relative motion, slip or sweep, causes eddy-currents in the inductor 21, and particularly in the conducting bands 27 and 29. The bands 27 and 29 are made thin, as shown, in order to reduce the magnetic gap as much as possible. The resulting eddy-currents set up a magnetic reaction to the flux field from the teeth 61 and 63. This effects a magnetic drag or delivery of torque to the sleeve 49. Torque is delivered from the sleeve 49, through locking bearings 43, to the hub 17 and driven shaft 15.

The applied torque accelerates the driven shaft 15 and in doing so has the two effects: (1) The relative rate of sweep of the teeth 61 and 63, with respect to the inductor 21 is reduced, and, (2) increasing centrifugal force actuates the weights 69 to rotate clockwise. Inasmuch as the rollers 77 bear upon a surface which is not movable endwise, a reaction is set up to draw the sleeve 49 to the right, thereby increasingly moving the teeth 61 and 63 toward positions opposite the laminated rings 31 and 33 respectively.

Although the rings 31 and 33 will freely transmit magnetic flux, the laminated form prevents the efficient production of eddy-currents. Upon the efficient production of eddy-current depends the production of a reacting magnetic field. Thus, the driving reaction between the inductor 21 and the sleeve 49 is reduced as the sleeve moves to the right, and the slip between these members 21 and 49 is increased. This increase in slip is accomplished without a variation in the exciting current in the coil 35. Thus the circuit which feeds the coil 35 is devoid of any control contacts for the purpose of varying the slip. Its stationary character avoids the necessity for feeder rings and brushes.

The springs 79 have effective reaction points on the sleeve 49 whereby they pull upon the levers 75 which are pivoted on that same sleeve 49. Thus, contractions of the spring 79 result in inward movement of the weights 69. Outward movements of the weights 69 under centrifugal force cause stretching of the springs 79. On the other hand, the spring 57 tends to push the entire sleeve 49 to the left, thus always urging the assembly of sleeve 49, weights 69 and springs 79 so that the roller 77 contacts the hub 17. Hence the weights 69, springs 79 and sleeve 49 are in static equilibrium under action of centrifugal force to predeterminately position the roller 77; whereas the spring 57 assures that said rollers 77 shall be against the hub 17, whatever their positions as determined by the centrifugal force and the springs 79.

In view of the above, it will be seen that the rotation of the driving shaft 11 may be variable in rate while transmitting substantially a constant speed to the driven shaft 15. Whenever the shaft 11 increases its angular velocity, the incipient increase in angular velocity of the driven shaft 15 causes the weights 69 to shift the teeth 61 and 63 into a position more within the rings 31 and 33 respectively, so as to increase the slip and prevent any more than an incipient increase in angular velocity of the shaft 15. On the other hand, should the angular velocity of the shaft 11 drop, then the incipient decrease in angular velocity of the shaft 15 is met by an inward movement of the weights 69 (under action of the springs 79), together with a left-hand movement of the teeth 61 and 63, whereby the efficiency of the magnetic coupling is again increased so as to prevent the incipient drop of speed of said shaft 15. Thus the shaft 15 maintains a substantially constant speed under variable speeds of the shaft 11.

Further details in respect to the theory of magnetic couplings formed by flux-concentrating radial teeth, may be found by reference to said Patent 2,106,542 of Anthony Winther. For the purpose of the present application it is only necessary to note that said teeth constitute magnetic poles wherein exciting windings are not upon the poles themselves. However, it is to be understood that magnetic poles with windings upon them are, broadly speaking, equivalents of such teeth.

It should be understood that in the present specification and in the claims, the term "tooth" is used to designate any means whereby a cylindric surface or the like is adapted to produce a flux concentration of emanating flux.

It will be clear that a single row of teeth could be used in the form of the invention used in Fig. 1, or more than two rows. The purpose of multiplying the rows is to obtain as large a differentiating driving effect in response to as little as possible endwise tooth motion.

It will be understood that the driven member may carry the inductive elements of the drive and that the speed responsive means may control the flux-concentrating means on the driving member, thus effecting an inversion of relationship between the flux-concentrating means and the inductive portions of the drive. Although at present it appears that this would involve more complication than the preferred form above described, nevertheless the claims herein are intended to cover such a construction.

In Figures 5 to 8 are shown three alternate embodiments of the invention. Like numerals designate like parts in the various alternatives, and numerals have been changed only where necessary to describe the respective variation. In order to avoid needless repetition of drawing details, Figures 5 to 8 have been made diagrammatic.

Figure 5:
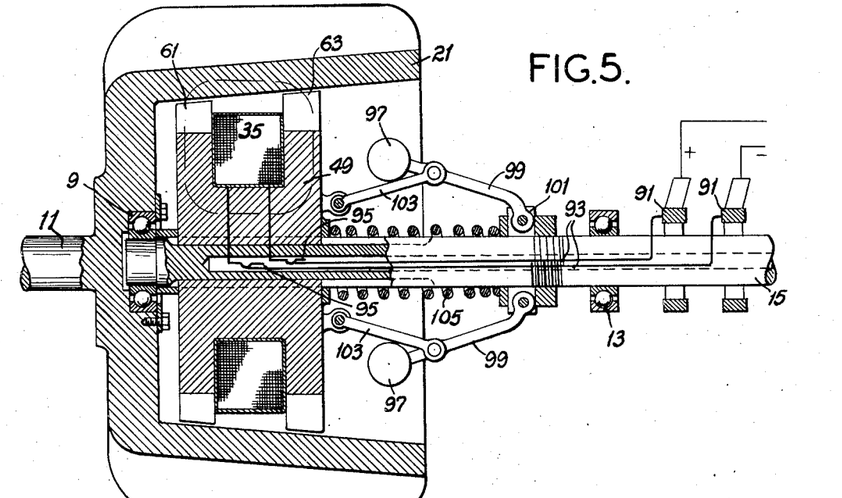
Fig. 5 is a diagrammatic longitudinal section of a first alternative form of the invention.

In Fig. 5 the exciting coil 35 is shown as being borne upon sleeve 49. The sleeve is splined to the driven shaft 15 so that it may be translated axially but not rotated relatively to the shaft 15.

Current is brought to the coil 35 by way of insulated collector rings 91 which energize bus bars 93, the latter being suitably insulated from and mounted in connection with the shaft 15. Slide contacts 95 effect closure of the circuit through the coil 35. The energization of the coil 35 is constant.

The inner shape of the inductor 21, instead of being generally cylindric is conic and likewise are the outer bounding faces of the teeth 61 and 63. Thus, if the sleeve 49 be moved to the right, the magnetic gap of the field of the coil 35 is increased and vice versa. Centrifugal weights 97 are carried by links 99 which are pivoted to a reaction collar 101. Links 99 are linked by means of a link 103 with the sleeve 49. A spring 105 normally presses the sleeve 49 to the left, that is, to the position of maximum magnetic driving effect. As the speed of the driver increases, the driven member is incipiently accelerated so that the centrifugal force incipiently moves out the weight 97 to draw sleeve 49 to the right. The increased magnetic gap immediately increases the slip so that the incipient rise in speed of the shaft 59 does not progress further. Likewise, upon an incipient drop in speed of the shaft 15, the inverse events occur.

The form of the invention shown in Fig. 5 includes slide contacts at the collector rings, and to that extent is not as advantageous as the preferred form of Fig. 1. However, such apparatus is an improvement over apparatus heretofore used, because it avoids the multiplicity of contacts which have been used in the energizing circuit for the coil 35.

Figure 6:
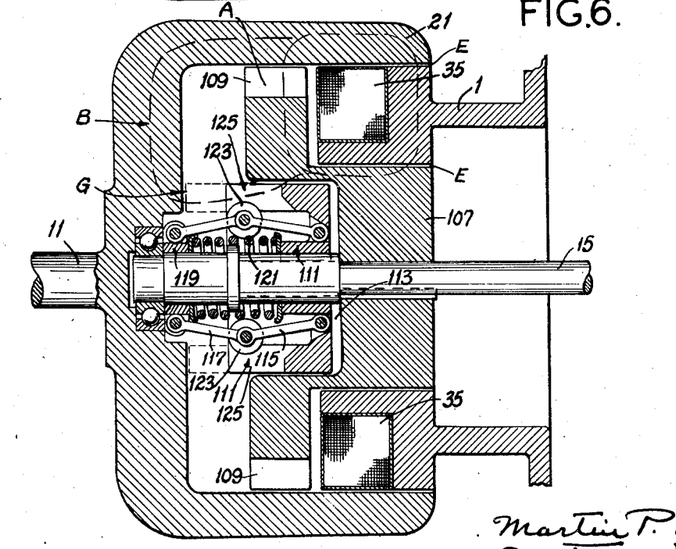
Fig. 6 is a diagrammatic longitudinal section of a second alternative form.

In Fig. 6 is shown an alternative form of the invention in which contacts of any kind are altogether avoided, as in the preferred form. In this construction, the toothed inductor 21 is again cylindric on the bounding tooth faces. In this case, the teeth are not on a slidable sleeve, such as sleeve 49. Numeral 107 designates the member on which teeth 109 are formed radially. This member 107 is keyed to the driven shaft 15 and is held against both relative angular and axial motion.

Splined to the driven shaft 15 is a cup-shaped para-magnetic member 111 which slidably fits into a socket 113 of the driven member 107. Pivoted to the member 111 is a link 115 which is pivoted to a second link 117, the latter being pivoted to a fixed collar 119 on the driven shaft 15. A compression spring 121 normally forces the member 111 to the right to nest it within the socket 113. Weights 123 serve to force linkage 115, 117 into a position to draw the member 111 to the left under increased angular velocity of the shaft 15. Suitable slots 125 accommodate the swing of the weight 123. It is to be understood that the recesses 125 do not form teeth. There is a low number of them to accommodate, for example, two weights, and their articulated linkages.

In this form of the invention the coil 35 is again in a stationary frame 1, and the flux circuit under starting conditions is as indicated by the long arrows at index A. As the driven member 15 is accelerated, under driving action from the driving shaft 11, the centrifugal force on the weights 123, through the linkage 115, 117, forces the member 111 to be left, thus causing more of the flux to be deflected from the path A to the by-pass magnetic circuit indexed B. More and more flux is by-passed as the flux gap indicated at G is made smaller. Since the efficient magnetic coupling action occurs by reason of the juxtaposition of a toothed form adjacent a smooth form, such as at the teeth 109, and not at the juxtaposition between relatively smooth faces such as E, the magnetic coupling between members 21 and 107 is decreased as the speed of drive shaft 11 increases, and vice versa. Thus the speed of the driven shaft 15 is maintained at substantially a constant value.

Figure 7:
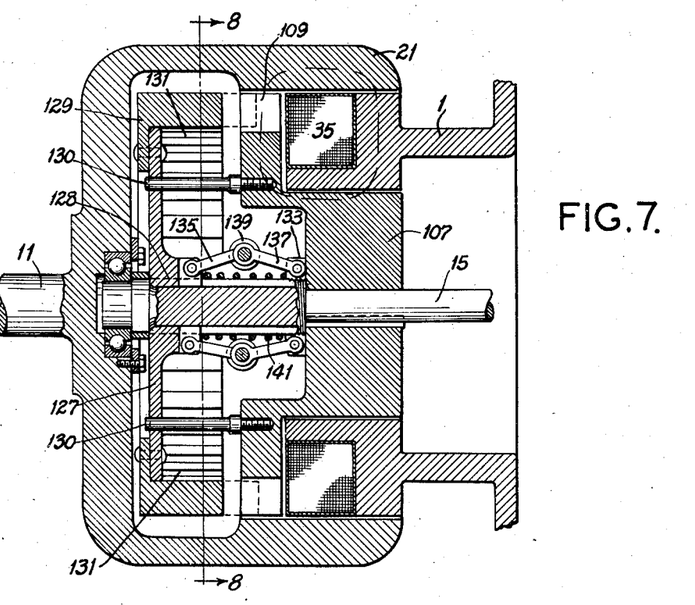
Fig. 7 is a diagrammatic longitudinal section of a third alternative form.

In Fig. 7 is shown a form of the invention in which the toothed characteristic of the driven member is varied in response to speed change. In this case, the coil 35 is again carried in the stationary member 1 and a driven member 107 is keyed to the driven shaft 15. The driven member 107 carries peripheral teeth 109.

Splined at 128 to the driven shaft 15 is a spider 127 which is preferably composed of a diamagnetic material, such as bronze.

In order that the splining 128 need not be relied upon entirely for preventing rotation but permitting sliding, between the spider 127 and the driven shaft 15, studs 130 are provided through openings in the spider 127. These studs permit longitudinal movement but aid the spline 128 in preventing relative angular movement.

Figure 8:
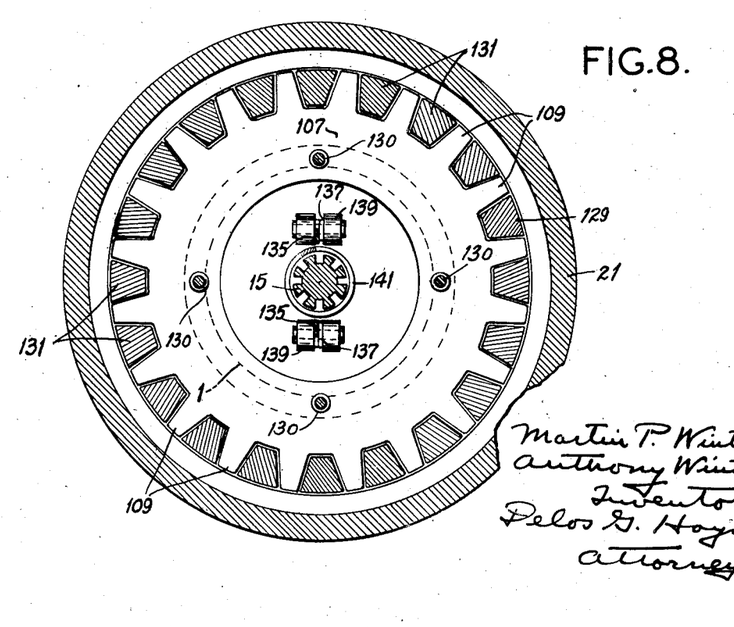
Fig. 8 is a vertical section taken on line 8—8 of Fig. 7.

Fastened to the periphery of the spider 127 is a rim 129 of para-magnetic material such as iron. Directed rearwardly from this rim are axial teeth 131. These teeth have sectional shapes which correspond to the spaces between the teeth 109, so that upon lateral movement they substantially fill said spaces, as shown in Fig. 8. The outside edges of the teeth are formed circularly so as to form a substantially cylindric bounding surface with the outside surfaces of the teeth 109. When the teeth 131 are positioned between the teeth 109, then the outside bounding surface of all of the teeth 109 and 131 is substantially a cylinder. This condition precludes any substantial localized concentration of any of the flux from coil 35. Thus, the driving efficiency of the magnetic connection between the inductor 21 and the driven member 107 is reduced as the teeth 131 are inserted between the teeth 109.

In order that the insertion of teeth 131 between teeth 109 may increase with incipient speed increase of the shaft 15, the spider 127 is articulated with a sleeve 133 by means of a linkage 135, 137, the latter carrying at its intermediate joint a weight 139. A suitable plurality of the linkages is used, such as two. A spring 141 normally forces the spider 127 to a point where the teeth 131 do not interfere with the concentrating action of teeth 109. As the speed of the driven shaft incipiently increases, the centrifugal force of the weights 139 draws the spider to the right so that the teeth are gradually inserted between the teeth 109 to effect the increase in slip.

The teeth 61 and 63, and others so far described herein, are generally of the type described in said Patent 2,106,542 of Anthony Winther. For the purpose of the present invention, a salient-pole type of machine may be used in which the winding is on the poles, the poles being tapered as specified in Anthony Winther Reissue Patent 20,225, dated December 29, 1936. The salient-pole construction is shown in the alternative form of the invention shown in Figs. 9 and 10.

Figure 9:
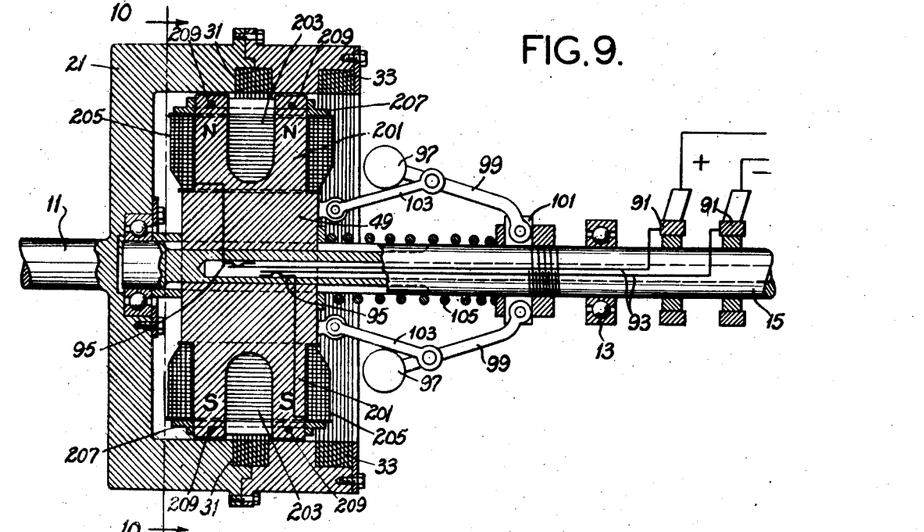
Fig. 9 is a diagrammatic longitudinal section of a fourth alternative form; and, Fig. 10 is a vertical section taken on line 10—10 of Fig. 9.
Figure 10:
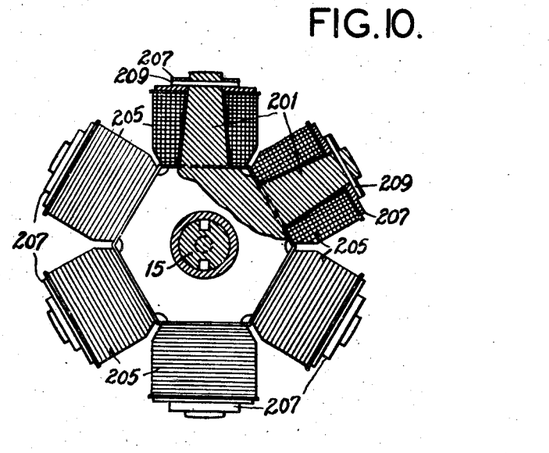

In Figs. 9 and 10 like numerals designate like parts, such as shown in Fig. 5; but, instead of using rotor teeth, we use salient poles 201, preferably six of them, as shown in Fig. 10. Each salient pole is elongated axially and bifurcated peripherally as shown at 203, in order that the ends adjacent the bifurcations may lie to the left of the respective bands of laminations 31 and 33. Around the bifurcated poles are wrapped salient-pole windings 205 with brass holding caps 207. The pole caps 207 are held by brass pins 209. The pins and caps, being brass, are non-magnetic.

The windings 205 are connected in series and energized from the bars 93. Alternate poles 201 are wound to become north and south respectively. The flux emanating from, and passing to, the poles may pass either through the inductor 21 or the laminated bands 31 and 33, depending upon the position of the sleeve 49. The energization of the windings 205 is preferably constant.

In view of the above, it will be seen that if the sleeve 49 is moved to the right, the flux passing out of or into the poles 201 is accommodated by the member 21 at lower speeds, with the result that the inductive effect may be taken advantage of to effect driving; whereas when the field passes into the laminated regions, at higher speeds, the inductive effect is reduced to permit increased rotary slippage.

In each of the alternative forms of the invention shown in Figs. 5, 6, 7 and 9, no copper band is shown in the inductor member 21. This is for the purpose of simplifying the description of these forms. It should be also observed that such conducting bands, while advantageous, are not absolutely necessary for satisfactory operation.

It will be noted that a common feature of all of the forms of the invention is the mechanical control or distortion of the magnetic flux path in response to incipient speed changes. By this means the control by means of contacts in the eelctrical circuit of the coil 35 is avoided.

Although the electromagnetic control which is herein described is shown as applied to an electromagnetic transmission, the invention may be applied to analogous electromagnetic machines, such as for example electromagnetic dynamometers, and the like.

In view of the above, it will be seen that the several objects of the invention are achieved and other advantageous results attained.

As many changes could be made in carrying out the above construction without departing from the scope of the invention, it is intended that all matter contained in the above description or shown in the accompanying drawings shall be interpreted as illustrative and not in a limiting sense.

We claim:

1. An electromagnetic control comprising means for producing a magnetic flux circuit, a moving driving member in the field of said flux, a member adapted to be forced by said driving member and also in the field of said flux, one of said members having a magnetic pole adjacent to the other, said other member having an adjacent region of relatively high eddy-current capacity and another region of relatively low eddy-current capacity, and means responsive to the forcing effect on said forced member adapted to move said pole from a point adjacent the high eddy-current region to a point adjacent the low eddy-current region.

2. An electromagnetic drive comprising a driving member, a driven member, one of said members having a relatively smooth inductive face, part of which freely produces eddy-currents and another part of which inhibits their formation, the other member having a flux-concentrating means adjacent the inductive member, an electric coil adapted to produce passage of electromagnetic flux through said driving and driven members, and means responsive to incipient velocity change in the driven member adapted to change the position of said flux-concentrating means with respect to said different parts on the inductive member.

3. In an electromagnetic drive, an inductive driving member, a driven member, an electric coil adapted to produce flux passing through the driving and driven members, flux-concentrating means on the driven member, said inductive member having a region of high-eddy-current production and a region of low-eddy-current production, and means responsive to incipient velocity change in the driven member adapted to move said flux-concentrating means from a position adjacent the high-eddy-current region to a position adjacent the low-eddy-current region as the speed tends to rise, and vice versa.

4. An electromagnetic drive comprising an inductive driving member, a driven member, means for producing a magnetic field passing through the driving and driven members, said inductive member having a plurality of regions of high-eddy-current production and a plurality of regions of low-eddy-current production, a plurality of rows of flux-concentrating means on said driven member, means responsive to incipient speed change of said driven member adapted to move said plurality of rows of flux-concentrating means from positions adjacent one of said regions to the other in response to incipient speed change of the driven member.

5. Electromagnetic driving apparatus comprising a driving member, a driven member, one of said members being inductive and having a plurality of regions of high-eddy-current production and a plurality of adjacent regions of low-eddy-current production, the other of said members having a plurality of bands of flux-concentrating means, and means responsive to incipient speed change of the driven member adapted to move said plurality of bands of flux-concentrating means from points adjacent one of said regions to points adjacent the other of said regions.

6. An electromagnetic drive comprising an inductive driving member, said driving member having a plurality of peripheral regions of high-eddy-current production and groups of laminated rings respectively adjacent thereto, a driven member, means adapted to produce a flux field passing through said driven member and said inductive member, said driven member having a plurality of groups of flux-concentrating means, and centrifugal means responsive to incipient speed change of the driven member adapted to shift said plurality of flux-concentrating means from positions adjacent the regions of high-eddy-current production to regions adjacent said laminated rings, respectively.

7. In an electromagnetic transmission, an inductive driving means, a driven means, a stationary coil producing a flux field passing through the driving and driven means, said driving means having a region of high-eddy-current production, a laminated ring adjacent said region and having a low-eddy-current production, flux-concentrating means on said driven member, means for moving said flux-concentrating means from a position adjacent said region of high-eddy-current production to a position adjacent said ring, and centrifugal means responsive to incipient speed change in the driven member adapted to shift said moving means.

8. In an electromagnetic transmission, a cup-shaped inductive driving means, a driven means within the cup-shape, a stationary coil producing a flux field passing through the driving and driven means, said driving means having a peripheral region of high-eddy-current production, a laminated para-magnetic ring adjacent said region having a low-eddy-current production, flux-concentrating teeth on said driven member, means for moving the teeth from a position adjacent said peripheral region to a position adjacent said ring, and centrifugal means responsive to incipient speed change in the driven member adapted to shift said teeth.

9. In an electromagnetic transmission, a cup-shaped inductive driving means, a driven means comprising a hub and a sleeve mounted thereon for axial movement but held against relative rotary movement, a stationary coil producing a flux field passing through the driving means and said sleeve, said driving means having a peripheral region of high-eddy-current production, a laminated ring adjacent said region having a low-eddy-current production, flux-concentrating teeth on said sleeve, and a centrifugally weighted linkage on said sleeve adapted to move said sleeve from a position wherein said teeth are adjacent said peripheral region to a position where the teeth are adjacent said ring.

10. In an electromagnetic transmission, a cup-shaped inductive driving means, a driven means comprising a hub and a sleeve mounted thereon for axial movement but held against relative rotary movement, centrifugally operable weights pivoted to said sleeve and adapted to axially move said sleeve in response to incipient speed change of the driven means, spring return means for the weights and said sleeve, a stationary coil producing a flux field passing through the driving means and said sleeve, said driving means having a peripheral region of high-eddy-current production and a peripheral region of low-eddy-current production adjacent the first-named region, flux-concentrating teeth on the sleeve, said weights being adapted to move said sleeve from a position wherein said teeth are adjacent said peripheral region of high-eddy-current production to a position where the teeth are adjacent said peripheral region of low-eddy-current production and vice versa.

11. In an electromagnetic transmission, a cup-shaped inductive driving means, a driven means comprising a hub and a sleeve mounted thereon for axial movement but held against relative rotary movement, centrifugal means on said sleeve adapted to axially move said sleeve in response to speed change of the driven means, a stationary member, a coil therein producing a flux field passing through the stationary member, the driving means and said sleeve, said driving means having a peripheral region of high-eddy-current production, a peripheral region of low-eddy-current production adjacent the first named region, flux concentrating means on the sleeve, said centrifugal means being adapted to move said sleeve from a position wherein said teeth are adjacent said peripheral region of high-eddy-current production to a position where the teeth are adjacent said peripheral region of low-eddy-current production, said stationary member and said driving means having a flux gap adapted to limit transmission of flux between said members substantially to a radial direction.

12. An electromagnetic drive comprising a driving member, a driven member, one of said members having an inductive face, part of which face freely produces eddy-currents and another part of which inhibits their formation, the other member having salient magnetic poles, individual coils on said poles adapted to produce passage of electromagnetic flux through said driving and driven members, and means responsive to incipient velocity change in the driven member adapted to change the position of said poles with respect to said different parts on the inductive member.

13. An electromagnetic drive comprising an inductive member, a second member, means for producing a magnetic field passing through said members, said inductive member having a plurality of regions of high-eddy-current production and a plurality of regions of low-eddy-current production, a plurality of belts of flux-concentrating means on said driven member, said flux-concentrating means comprising bifurcated, salient poles, individual windings on said poles and around the bifurcations, means responsive to incipient speed change of said driven member adapted to move said plurality of belts from positions adjacent the regions of high-eddy-current production to regions of low-eddy-current production, in response to incipient speed change of the driven member.

ANTHONY WINTHER.
MARTIN P. WINTHER.